United States Patent [19]

Brueck

[11] Patent Number: 4,972,632
[45] Date of Patent: Nov. 27, 1990

[54] DEVICE FOR CENTERING OF OPTIC LENSES IN A MECHANICAL MOUNTING, IN PARTICULAR DURING EDGE CUTTING AND BEVELLING

[75] Inventor: Erhard Brueck, Heuchelheim, Fed. Rep. of Germany

[73] Assignee: Wilhelm Loh Wetzlar Optikmaschinen GmbH & Co. KG, Wetzlar, Fed. Rep. of Germany

[21] Appl. No.: 289,921

[22] Filed: Dec. 23, 1988

[30] Foreign Application Priority Data

Dec. 24, 1987 [DE] Fed. Rep. of Germany ....... 3744117

[51] Int. Cl.$^5$ ............ B24B 9/14; B24B 5/02; B23B 19/00; B23B 3/14
[52] U.S. Cl. ............ 51/105 LG; 51/217 L; 51/217 T; 51/237 R; 82/122; 82/142; 82/903; 74/337; 74/650
[58] Field of Search ........... 51/105 LG, 106 LG, 162, 51/217 L, 217 T, 237 R, 277; 82/122, 142, 151, 165, 170, 903; 74/198, 208, 337, 650

[56] References Cited

U.S. PATENT DOCUMENTS

| | | | |
|---|---|---|---|
| 2,729,118 | 1/1956 | Emslie | 74/650 |
| 3,130,604 | 4/1964 | Johnson et al. | 74/650 |
| 3,599,377 | 8/1971 | Dartnell | 51/277 |
| 3,732,757 | 5/1973 | Cottin | 82/147 |
| 3,750,344 | 8/1973 | Raphael | 51/105 LG |
| 4,552,045 | 11/1985 | Inoue et al. | 82/132 |
| 4,596,169 | 6/1986 | Inoue et al. | 82/147 |
| 4,612,732 | 9/1986 | Delattre et al. | 51/105 LG |
| 4,766,788 | 8/1988 | Yashiki et al. | 82/147 |

FOREIGN PATENT DOCUMENTS

| | | |
|---|---|---|
| 1004516 | 8/1957 | Fed. Rep. of Germany . |
| 2148102 | 11/1978 | Fed. Rep. of Germany . |
| 3139873 | 4/1983 | Fed. Rep. of Germany . |

*Primary Examiner*—William E. Terrell
*Attorney, Agent, or Firm*—Flynn, Thiel, Boutell & Tanis, P.C.

[57] ABSTRACT

For centering of optic lenses in a mechanical mounting, in particular during edge cutting and bevelling, the invention includes a device with a housing (10), which is resistant to twisting and which supports centering spindles (18, 18') with clamping cups (20, 20') thereon, between which clamping cups a lens (L) can be aligned and clamped for a cutting operation. A motor drive (M, R) acts on a torque divider (50) having a guide member (52) between axially and radially supported plates (58, 58'). Their frictional connection through a ring of balls (54) with controllable contact pressure, which is introduced through a pressure piece (62), assures an absolute synchronous running of the split drive shaft (14, 14') which acts on the centering spindles (18, 18') through belt drives (46, 46').

8 Claims, 2 Drawing Sheets

DEVICE FOR CENTERING OF OPTIC LENSES IN A MECHANICAL MOUNTING, IN PARTICULAR DURING EDGE CUTTING AND BEVELLING

CROSS REFERENCE TO RELATED APPLICATIONS

This application is related to my three copending applications filed concurrently herewith, each application having the same title, but separately identified as Ser. No. 289,903, now U.S. Pat. No. 4,941,291; Ser. No. 289,920, U.S. Pat. No. 4,951,421; and Ser. No. 289,922, U.S. Pat. No. 4,926,588.

FIELD OF THE INVENTION

The present invention relates to a device for centering optic lenses in a mechanical mounting, in particular during edge cutting and bevelling of the lens.

BACKGROUND OF THE INVENTION

According to German Pat. No. 1 004 516, the lens is for this purpose clamped at high pressure between two cups, so that its position cannot change by itself. To center the lens, the clamping cups are vibrated by ultrasound during the clamping operation in order to convert the static friction between cup and lens into a lower sliding friction. However, this transition occurred sporadically, which often caused damage to the lens due to an undesired material removal.

Furthermore, an attempt has been made to drive the clamping cups during clamping of the lens in opposite directions of rotation. Here too a high risk exists that lens damage will occur, that is, cutting tracks in the form of rings cut into the surface of the lens can hardly be avoided.

German Auslegeschrift No. 21 48 102 suggests to arrange a piezoceramic case vibrator on the elevationally nonchangeable clamping cup, which case vibrator is electrically controlled by a threshold switch such that the clamping cup force drops off when reaching a given pressure, which causes the vibration generator to be turned off. The piezovibrator is used at the same time to test the clamping pressure, to which the vibrational amplitude is regulated. Electronic instabilities are disadvantageous in this arrangement. Furthermore, the vibrator has a not insignificant sensitivity with respect to axial pressure. An initial stress is created during clamping due to the pressure load; a supporting of the vibrator is therefore problematic.

From German Offenlegungsschrift No. 31 39 873 a device is known in which the irregularities of a gear drive are utilized to produce relative movements between lens and clamping cup. A balanced differential is provided as a compensating device between the two parts of a two-part centering spindle and the drive shaft. A hydraulic clamping cylinder is provided for a pressure plate of the upper, axially movable spindle. Due to the high friction of the clamping spindle in its slide bearing, a precise regulating of the clamping pressure is, however, difficult to realize, so that this device can also only be utilized in a limited way.

The purpose of the invention is, while overcoming the disadvantages of the state of the art, to provide an improved drive for the centering spindle, to make possible, with a reliable clamping of the lens, a damage-free machining of the lens. Furthermore, the effective torque is most sensitively adjustable and regulatable at every instant.

By inventively drivingly connecting a drive shaft through a belt drive to the centering spindles, machining can be done at a high speed and correspondingly little surface removal at a high machining performance can be achieved at the periphery. The belt drive replaces a common gearing, so that gears with their rolling behavior, which is irregular in the micro-range, are excluded from the drive train for the centering spindles and their synchronous running is assured.

In addition it is possible that the drive shaft is drivingly connected through a further belt drive to the motor. It is further provided that the belt drive acts on the drive shaft through a torque divider. The torque divider is constructed in two parts with the torque divider being arranged in a conventional manner between its two parts. The drive shaft and/or the torque divider is supported in the housing by means of a bearing, which is preferably arranged at the height of the clamping cups parallel with respect to the direction of the axes. This permits a very precise adjustment of the clamping force and torque to the respectively given lens geometry. It is particularly advantageous that the bearing for the shaft parts on the output side is constructed smoothly and exactly fitting, in particular with precisely aligned radial bearings The torque divider operates step-free and smoothly. It can have a guide member between two roller-supported plates, which are each drivingly connected to one of the shaft parts. This guide member can be constructed on the outer periphery as a belt pulley for the motor belt drive. This design is structurally simple; it assures a high efficiency of the drive with a degree of precision guiding.

An important further development of the invention consists in the guide member being a particularly plate-shaped ball race and the plate-shaped plate running with its peripheral parts on a ring of balls. Furthermore, the guide member can have shaft ends with shoulders, which are each supported through axial and radial bearings in the associated plates. Because of the balls rolling with relative movements along the friction plates, the frictional connection between the lens and the clamping cups overcomes the inner friction of the torque divider, so that an absolute synchronous run of the centering spindles is assured by the compensating movement.

It is advantageous if the guide member of the torque divider is rotatably supported with an adjustable or regulatable frictional connection between the plates, with at least one plate, being loadable axially toward the other plate by a pressure-medium-operated pressure piece. The clamping device can be operated through a pressure medium, which at the same time loads a piston for the pressure piece. The latter is guided axially movably in a plate and is preferably axially elastically supported, for example with a suspension.

Thus the torque divider consists of an upper and a lower plate. Its drive occurs steplessly and smoothly due to the balls being supported in the guide member, for which purpose the contact pressure adjusts the driving movement through the pressure piece onto the lower and upper plate.

BRIEF DESCRIPTION OF THE DRAWINGS

Further characteristics, details and advantages of the invention result from the wording of the claims and from the following description of one exemplary embodiment in connection with the drawings, in which:

DETAILED DESCRIPTION

Figure 1:
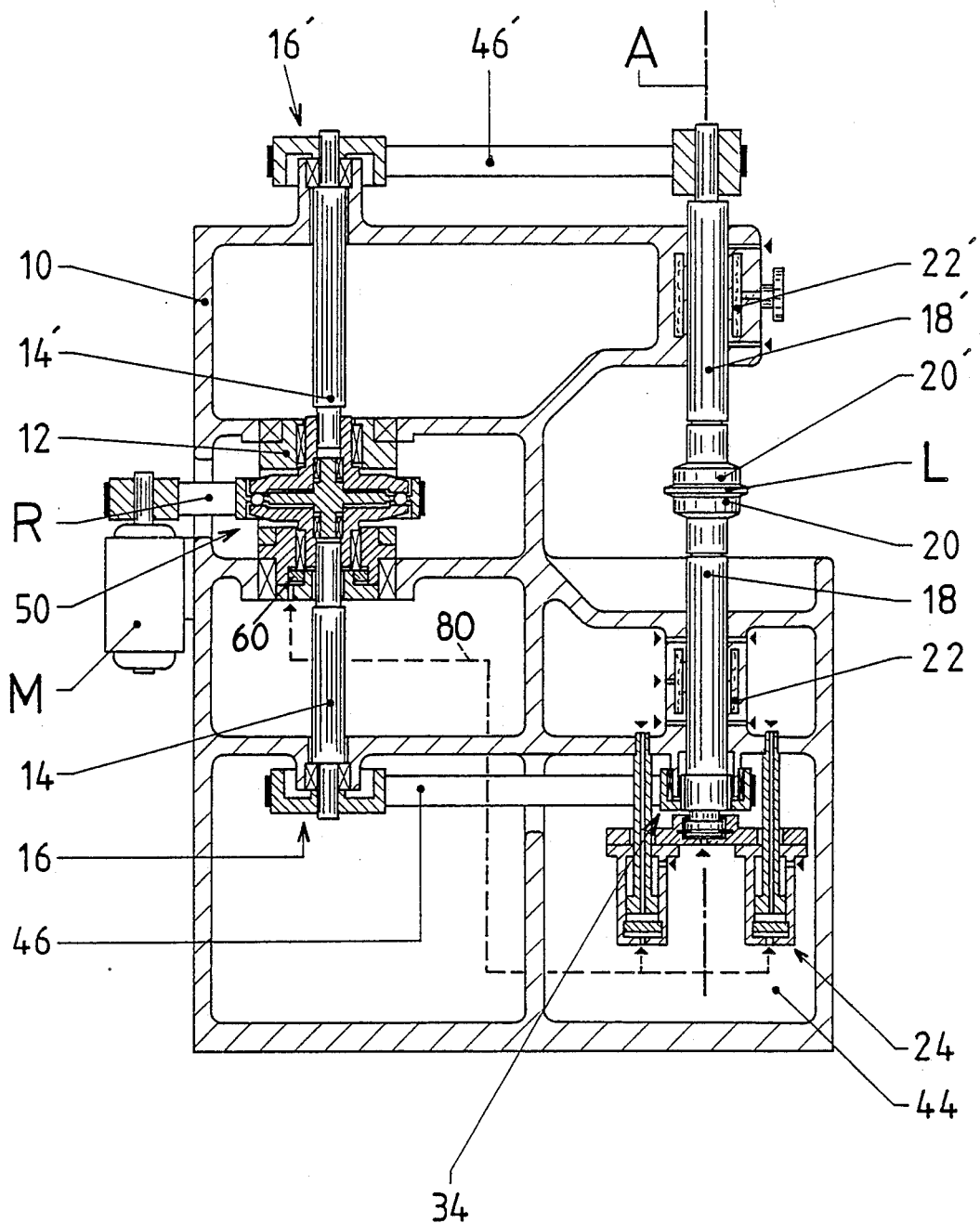
FIG. 1 is axial cross-sectional view of a centering device.

The centering device shown in FIG. 1 includes a housing 10 having a main bearing 12 and a two-part drive shaft 14, 14′. The two part drive shaft drives a lower centering spindle 18 and an upper centering spindle 18′ through drive elements 16, 16′ and the belt drives 46, 46′. The two centering spindles carry clamping cups 20 or 20′, between which a lens L can be clamped. The centering spindles 18, 18′ are supported in the housing 10 aligned by guiding and clamping bearings 22, 22′, namely in projecting parts of the C-shaped housing 10, which has a honeycomb structure and thus has a high resistance to twisting. A chamber 44 is arranged in the lower projecting part of the housing 10, in which chamber is provided a clamping device 24 for the lower centering spindle 18.

Figure 2:
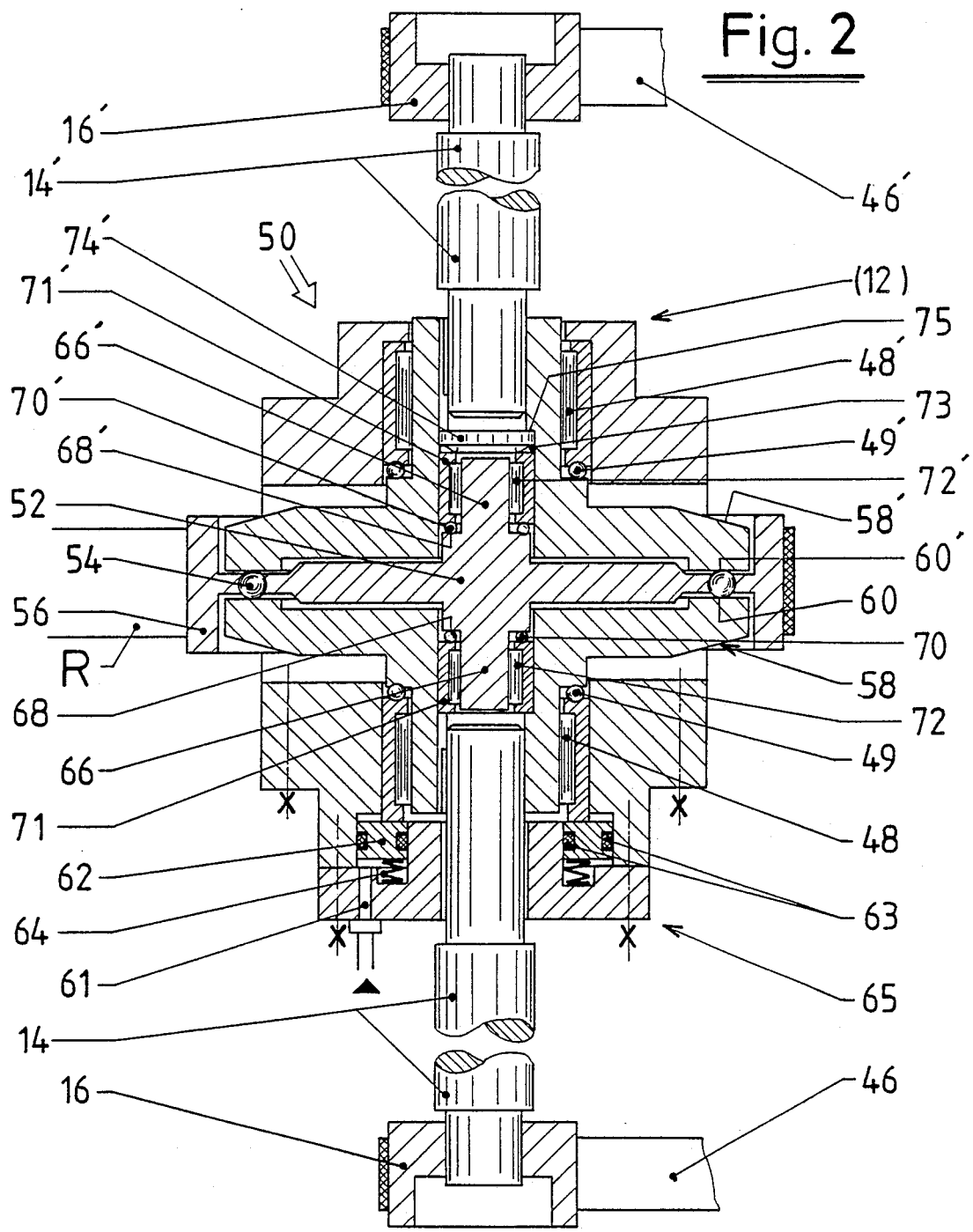
FIG. 2 is enlargement of a drive arrangement of the device of FIG. 1.

The torque needed for edge cutting and bevelling of a lens L is produced by a drive motor M and is transmitted onto a torque divider 50 through a belt drive R. As is particularly shown in FIG. 2, the torque divider 50 has a guide member 52 which can be constructed as a ball race with a peripheral belt pulley 56. The latter is part of the belt drive R. The guide member or ball race 52 has near its periphery a ring of balls 54, the balls of which sit between and engage two principally similarly constructed plates 58, 58′ near their edge 60, 60′. Through a frictional connection of the two plates 58, 58′ to the ring of balls 54, the torque introduced by the belt drive R is transmitted step-free and smoothly onto the drive shafts 14, 14′ and from there through the drive elements 16, 16′ and the belt drives 46, 46′ onto the centering spindles 18, 18′. A lens L is aligned and clamped for machining between the centering cups 20, 20′ through the clamping force produced by means of the clamping device 24.

Of importance is a pressure piece 62, which can be constructed as a rotary piston and can be sealed off with respect to the bearing 12 by means of gasket rings 63. The pressure piece 62 is supported in axial direction by pressure springs 64 on a support plate 65, which support plate has a bore 61 for a pressure-medium connection.

The plate-shaped guide member 52 has on both sides shaft ends 66, 66′ with shoulders 68, 68′, on which shoulders axial bearings 70, 70′ for guide sleeves 71, 71′ are supported. The latter are guided centrally slidingly movably in central openings in the plates 58, 58′ and are supported on the shaft ends 66, 66′ by radial bearings 72, 72′. The drive shafts 14, 14′ are fixedly connected against relative rotation to the plates 58, 58′ through groove and key. Radial bearings 48, 48′ and axial bearings 49, 49′ assure an exact guiding and supporting of the plates 58, 58′ in the bearing 12. The drive shafts 14, 14′ are drivingly connected with the two centering spindles 18, 18′ through the drive elements 16, 16′, which include the belt drives 46, 46′. A spring washer 73 can be arranged to provide an axial support between the upper guide sleeve 71′ and a driving plate 74, which rests on a shoulder 75 in the upper plate 58′.

The device operates as follows: The clamping force becomes active at the contact lines between the clamping cups 20, 20′ and the lens surface. The torque introduced through the centering spindles 18, 18′ is transmitted to the lens L by the friction between the lens L and the clamping cups 20, 20′. The amount of torque depends on the contact pressure produced at the contact lines, the friction active at the clamping and the diameter of the contact lines at the clamping cups 20, 20′. This torque must during machining always be larger than the cutting moment occurring at the edge of the lens. A higher torque with high clamping forces becomes therefore necessary for larger lenses; of course, the contact diameter is then also larger, so that the specific surface pressure active on the lens surfaces is favorably influenced.

A reliable torque transmission is inventively assured by loading the rotary piston 62, axially movably arranged in the lower plate 58 of the torque divider 50, with a medium which is under an increased pressure. Thus, a larger axial force acts on the lower plate 58, so that the frictional connection of the ring of balls 54 between the plates 58, 58′ is increased and thus also the torque to be transmitted is assuredly transmitted. If the rotary piston or the pressure piece 62 in the lower plate 58 is dimensioned fittingly in relationship to the clamping cylinders of the clamping device 24, then the same pressure medium can be used (see fluid connection 80 in FIG. 1) so that with an increase of the torque at the lens L, a corresponding torque increase at the torque divider 50 occurs.

A synchronous running of the centering spindles 18, 18′ is assured by the compensating movement in the torque divider 50 through the relative movements of the plates 58, 58′ designed as friction plates. The balls of the ring 54 roll on the edges 60, 60′ constructed as running surfaces, with relative movements being thereby possible without influencing the frictional connection.

One recognizes that the torque divider 50 of the inventive device assures a very favorable response sensitivity. It is true that its friction movement increases with an increased pressure load in the bearing points and thus on the balls of the ring 54, which balls are clamped between the plates 58, 58′, however, this action is advantageously balanced by the increased clamping force and the larger contact diameter of the lens L between the clamping cups 20, 20′. In the case of small lens diameters and correspondingly small torques, the pressure load on the friction plates 58, 58′ is lower, so that a higher response sensitivity exists.

All characteristics and advantages, which can be taken from the claims, the description and the drawings, including structural details, spacial arrangements and method steps, can be inventively important both by themselves and also in many different combinations.

The embodiments of the invention in which an exclusive property or privilege is claimed are defined as follows:

1. A device for centering optic lenses in a mechanical mounting for edge cutting and bevelling, comprising:
   a housing;
   a motor supported stationary with respect to said housing;
   a drive shaft rotatably supported in said housing and including two coaxially aligned drive shaft parts;
   a torque divider supported in said housing and drivingly connected between said motor and said drive shaft, said torque divider being arranged axially between said drive shaft parts;
   two coaxially aligned centering spindles rotatably supported in said housing, said centering spindles having mutually adjacent ends, said mutually adjacent ends carrying clamping cups thereon for clamping a lens therebetween substantially transversely with respect to an axial direction of said centering spindles;
a clamping device for moving one said centering spindle and the associated said clamping cup axially toward the other said centering spindle and associated said clamping cup for purposes of clamping a lens therebetween;
drive belts drivingly connected between said drive shaft parts and said centering spindles;
at least one of said drive shaft and said torque divider being supported in said housing by means of a bearing structure, said bearing structure being located, with reference to the axial direction of said centering spindles, substantially alongside said clamping cups;
said torque divider including two axially opposed plates, a guide member disposed between said plates and drivingly connected to said motor, each of said plate being drivingly connected to a respective one of said drive shaft parts, and means for supporting said guide member rotatably with respect to said plates;
said guide member being platelike, said torque divider including a plurality of balls, said guide member including means for carrying said balls rollably disposed thereon and for guiding said balls for rotation with said guide member in an annular configuration, and said balls being axially captured in said guide member and between said plates along respective peripheral portions of said plates, said plates being roller-supported on said balls; and
said bearing structure including means for urging said plates together such that said plates frictionally engage said balls, and said urging means including an axially movable pressure piece adjacent one said plate, and means or applying a pressurized fluid against said pressure piece to move said pressure piece against said one plate.

2. The device according to claim 1, wherein said pressure piece is axially elastically supported in said bearing structure.

3. The device according to claim 2, wherein said bearing structure includes a support plate, and spring means arranged on said support plate, and wherein said pressure piece is axially elastically supported on said support plate by said spring means.

4. A device for centering optic lenses in a mechanical mounting for edge cutting and bevelling, comprising:
a housing;
a motor supported stationarily with respect to said housing;
a drive shaft rotatably supported in said housing and including two coaxially aligned drive shaft parts;
a torque divider supported in said housing and drivingly connected between said motor and said drive shaft, said torque divider being arranged axially between said drive shaft parts;
two coaxially aligned centering spindles rotatably supported in said housing, said centering spindle having mutually adjacent ends, said mutually adjacent ends carrying clamping cups thereon for clamping a lens therebetween substantially transversely with respect to an axial direction of said centering spindles;
a clamping device for moving one said centering spindle and the associated said clamping cup axially toward the other said centering spindle and associated said clamping cup for purposes of clamping a lens therebetween;
drive belts drivingly connected between said drive shaft parts and said centering spindles;
at least one of said drive shaft and said torque divider being supported in said housing by means of a bearing structure, said bearing structure being located, with reference to the axial direction of said centering spindles, substantially alongside said clamping cups;
said torque divider including two axially opposed plates, a guide member disposed between said plates and drivingly connected to said motor, each said plate being drivingly connected to a respective one of said drive shaft parts, and means for supporting said guide member rotatably with respect to said plates;
said guide member being platelike, said torque divider including a plurality of balls, said guide member including means for carrying said balls rollably disposed thereon and for guiding said balls for rotation with said guide member in an annular configuration, and said balls being axially captured in said guide member and between said plates along respective peripheral portions of said plates, said plates being roller-supported on said balls;
said bearing structure including means for urging said plates together such that said plates frictionally engage said balls, and said urging means including an axially movable pressure piece adjacent one said plate, and means for applying a pressurized fluid against said pressure piece to move said pressure piece against said one plate; and
said pressure piece being a piston, said clamping device being actuable by pressurized fluid, and said housing including means for providing fluid communication between said clamping device and said pressure piece.

5. The device according to claim 4, wherein said motor is drivingly connected to said guide member by a motor drive belt.

6. The device according to claim 4, wherein said drive shaft parts are rotatably supported in said bearing structure by smooth, accurately fitting, precisely aligned radial bearings.

7. The device according to claim 4, wherein said means for supporting said guide member rotatably with respect to said plates includes each said plate having means for defining a central opening therein, said guide member having oppositely axially extending shaft ends which are received in respective said central openings, said shaft ends including means defining shoulders thereon, bearings provided in each said central opening, and said guide member being rotatably supported on said bearings at said shoulders of said shaft ends.

8. The device according to claim 5, wherein an outer peripheral portion of said guide member is constructed as a belt pulley and is drivingly engaged with said motor drive belt.

* * * * *

UNITED STATES PATENT AND TRADEMARK OFFICE
CERTIFICATE OF CORRECTION

PATENT NO. : 4,972,632
DATED : November 27, 1990
INVENTOR(S) : Erhard BRUECK

It is certified that error appears in the above-identified patent and that said Letters Patent is hereby corrected as shown below:

Column 5, line 39; change "or" to ---for---.

Signed and Sealed this

Twenty-third Day of June, 1992

*Attest:*

DOUGLAS B. COMER

*Attesting Officer*     *Acting Commissioner of Patents and Trademarks*